(12) United States Patent
Lagerholm

(10) Patent No.: US 10,742,566 B2
(45) Date of Patent: *Aug. 11, 2020

(54) LOW-REDISTRIBUTION LOAD BALANCING

(71) Applicant: Microsoft Technology Licensing, LLC, Redmond, WA (US)

(72) Inventor: Stephan Lagerholm, Yarrow Point, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/180,346

(22) Filed: Nov. 5, 2018

(65) Prior Publication Data

US 2019/0075060 A1 Mar. 7, 2019

Related U.S. Application Data

(63) Continuation of application No. 15/187,592, filed on Jun. 20, 2016, now Pat. No. 10,122,647.

(51) Int. Cl.
| | |
|---|---|
| *G06F 15/173* | (2006.01) |
| *H04L 12/911* | (2013.01) |
| *G06F 9/50* | (2006.01) |
| *H04L 29/12* | (2006.01) |
| *H04L 29/08* | (2006.01) |

(52) U.S. Cl.
CPC ............ *H04L 47/70* (2013.01); *G06F 9/5083* (2013.01); *H04L 61/1511* (2013.01); *H04L 67/10* (2013.01)

(58) Field of Classification Search
CPC ..... H04L 47/70; H04L 61/1511; H04L 67/10; G06F 9/5083

USPC ........................................................ 709/226
See application file for complete search history.

(56) References Cited

U.S. PATENT DOCUMENTS

| | | | | |
|---|---|---|---|---|
| 7,003,574 B1 * | 2/2006 | Bahl | ....................... | H04L 29/06 709/203 |
| 7,072,981 B1 * | 7/2006 | O'Rourke | ............... | H04L 29/12 709/200 |

(Continued)

FOREIGN PATENT DOCUMENTS

WO     2005091134 A2     9/2005

OTHER PUBLICATIONS

"Office Action Issued in European Patent Application No. 17740504. 0", dated Jan. 17, 2020, 7 Pages.

*Primary Examiner* — Imad Hussain
(74) *Attorney, Agent, or Firm* — Davin Chin; Chin IP, PLLC

(57) ABSTRACT

A load-balancing computing device receives a load-balance request for a processing of a workload request associated with a workload. The load-balancing computing device selects a member node of a distributed computing system to process the workload request. The member node is selected from amongst a pool of member nodes of the distributed computing system. The selecting includes: determining a member node for a baseline assignment for the workload; and selecting a member node based on an outcome of a mathematical operation performed on an identifier of the workload, the baseline cardinality of member nodes, and on the cardinality of member nodes in the pool. Next, the processing of the workload request is assigned to the selected member node.

20 Claims, 8 Drawing Sheets

(56) References Cited

U.S. PATENT DOCUMENTS

| | | | | |
|---|---|---|---|---|
| 7,089,328 B1* | 8/2006 | O'Rourke | ......... | H04L 29/12009 709/201 |
| 7,660,909 B2* | 2/2010 | O'Rourke | ............... | H04L 29/12 709/214 |
| 8,392,368 B1* | 3/2013 | Kelly | .................... | G06F 16/182 707/634 |
| 8,914,513 B2* | 12/2014 | Dutta | ........................ | G06F 9/06 709/226 |
| 9,430,297 B2* | 8/2016 | Thai | ........................ | G06F 9/541 |
| 9,467,383 B2* | 10/2016 | Lin | ........................ | H04L 67/101 |
| 9,471,775 B1* | 10/2016 | Wagner | ............... | G06F 9/45533 |
| 9,756,050 B1* | 9/2017 | Brandwine | ........... | H04L 63/102 |
| 9,762,507 B1* | 9/2017 | Gandham | ............... | H04L 47/806 |
| 9,819,727 B2* | 11/2017 | Potlapally | ............... | H04L 67/10 |
| 2006/0080446 A1* | 4/2006 | Bahl | ........................ | H04L 29/06 709/227 |
| 2006/0233106 A1* | 10/2006 | Achlioptas | ............ | H04L 45/745 370/235 |
| 2006/0248231 A1* | 11/2006 | O'Rourke | ............... | H04L 29/12 709/245 |
| 2009/0172139 A1* | 7/2009 | Wong | .................... | G06F 9/5083 709/223 |
| 2011/0145390 A1* | 6/2011 | Kakadia | ................... | G06F 9/505 709/224 |
| 2011/0145420 A1* | 6/2011 | Kakadia | ................ | G06F 9/5083 709/228 |
| 2011/0276695 A1* | 11/2011 | Maldaner | ............... | G06F 9/5083 709/226 |
| 2012/0084443 A1* | 4/2012 | Theimer | ............. | G06F 9/45533 709/226 |
| 2012/0096165 A1* | 4/2012 | Madduri | ............... | G06F 9/5011 709/226 |
| 2014/0244785 A1* | 8/2014 | Potlapally | ............... | H04L 67/10 709/217 |
| 2014/0369204 A1* | 12/2014 | Anand | .................. | H04L 47/125 370/235.1 |
| 2015/0334179 A1* | 11/2015 | Eisenbud | ............ | H04L 67/1002 709/226 |
| 2016/0164797 A1* | 6/2016 | Reque | ................. | G06F 9/45533 718/1 |
| 2017/0099346 A1* | 4/2017 | Eisenbud | ................ | H04L 45/38 |
| 2017/0099361 A1* | 4/2017 | Digilov | ................ | H04W 4/023 |
| 2017/0371703 A1* | 12/2017 | Wagner | ................... | G06F 9/485 |
| 2018/0004553 A1* | 1/2018 | Wagner | ................ | G06F 9/5077 |
| 2018/0084032 A1* | 3/2018 | Potlapally | ............. | H04L 9/0662 |

* cited by examiner

| H | 5 | 4 | 3 | 2 | 1 | R |
|---|---|---|---|---|---|---|
| 7925 | 3 | 3 | 3 | 2 | 1 | 2 |
| 6472 | 2 | 2 | 2 | 2 | 1 | 1 |
| 9750 | 1 | 1 | 1 | 2 | 1 | 0 |
| 3322 | 5 | 2 | 2 | 1 | 1 | 2 |
| 2284 | 2 | 2 | 2 | 2 | 1 | 1 |
| 590 | 4 | 4 | 3 | 1 | 1 | 2 |
| 6103 | 5 | 2 | 2 | 2 | 1 | 2 |
| 978 | 1 | 1 | 1 | 1 | 1 | 0 |
| 7371 | 1 | 1 | 1 | 1 | 1 | 0 |
| 4119 | 1 | 1 | 1 | 1 | 1 | 0 |
| # OF TOP | 2 | 1 | 2 | 5 | | 10 |
| IDEAL | 2 | 2.5 | 3.3 | 5 | | |
| DIFF | 0 | 1.5 | 1.3 | 0 | 2.83 | |

FIG.6A

| H | 5 | 4 | 3 | 2 | 1 | R |
|---|---|---|---|---|---|---|
| 7925 | 1 | 2 | 3 | 2 | 1 | 4 |
| 6472 | 3 | 1 | 2 | 2 | 1 | 3 |
| 9750 | 1 | 3 | 1 | 1 | 1 | 2 |
| 3322 | 3 | 3 | 2 | 1 | 1 | 2 |
| 2284 | 5 | 1 | 2 | 1 | 1 | 3 |
| 590 | 1 | 3 | 2 | 1 | 1 | 2 |
| 6103 | 4 | 4 | 3 | 2 | 1 | 2 |
| 978 | 4 | 3 | 2 | 1 | 1 | 2 |
| 7371 | 2 | 4 | 1 | 2 | 1 | 4 |
| 4119 | 5 | 4 | 1 | 2 | 1 | 4 |
| # OF TOP | 2 | 3 | 2 | 4 | | 28 |
| IDEAL | 2 | 2.5 | 3.3 | 5 | | |
| DIFF | 0 | 0.5 | 1.3 | 1 | 2.83 | |

FIG.6B

LOW-REDISTRIBUTION LOAD BALANCING

CROSS-REFERENCE TO RELATED APPLICATION(S)

This application is a continuation of U.S. patent application Ser. No. 15/187,592, filed Jun. 20, 2016, entitled "LOW-REDISTRIBUTION LOAD BALANCING,". The entirety of this afore-mentioned application is incorporated herein by reference.

BACKGROUND

In computer networks, multiple member nodes may be used to operate in cooperation, e.g., as a distributed computing system, to improve upon the likely availability of a single member node. In such distributed computing systems, a load-balancing processes is often used to decide how to distribute the work amongst the member nodes in the distributed computing system.

BRIEF DESCRIPTION OF THE DRAWINGS

Non-limiting and non-exhaustive embodiments of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which:

FIGS. 6A and 6B are hash value/result tables illustrating example results for an example embodiment of the process of FIGS. 5A-5C, in accordance with aspects of the present disclosure.

DETAILED DESCRIPTION

Figure 1:
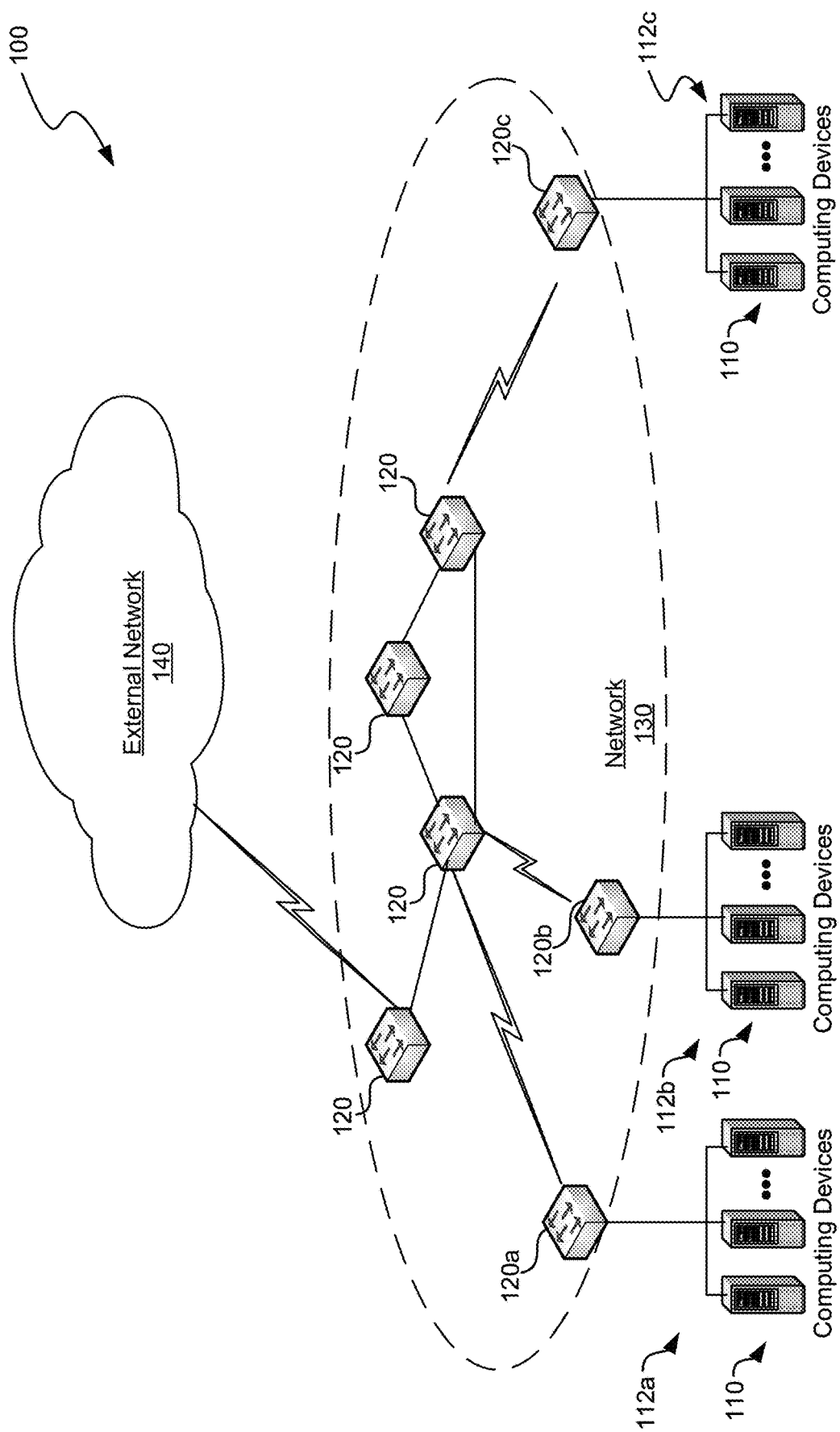
FIG. 1 is a block diagram illustrating one example of a suitable environment in which aspects of the technology may be employed.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of embodiments of the technology. It is intended that the terminology used in this disclosure be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," as used herein does not necessarily refer to the same embodiment, although it may. Use of a particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. As used herein, a "node" may be a device in some examples. A "deterministic function" is a function that, for a given set of inputs, always returns the same result.

INTRODUCTION

Briefly stated, a load-balancing computing device receives a load-balance request for a processing of a workload request associated with a workload. The load-balancing computing device selects a member node of a distributed computing system to process the workload request. The member node is selected from amongst a pool of member nodes of the distributed computing system. The selecting includes: determining a member node for a baseline assignment for the workload using a baseline function such that the member node determined for the baseline assignment for the workload corresponds to the member node selected upon a cardinality of member nodes in the pool being equal to a baseline cardinality of member nodes; and selecting a member node based on an outcome of a mathematical operation performed on an identifier of the workload, on the baseline cardinality of member nodes, and on the cardinality of member nodes in the pool, such that, if the cardinality of member nodes in the pool is less than the baseline cardinality of member nodes and the baseline assignment of the workload is to one of the member nodes in the pool, the member node assigned with the baseline assignment to the workload is selected. The mathematical operation is based, at least in part, on the baseline assignment for the workload. Next, the processing of the workload request is assigned to the selected member node.

In modern computer environments, the availability of individual nodes may not be sufficient to meet certain availability requirements, targets, goals, Service Level Agreements (SLA), or the like. Often, multiple nodes are operated in cooperation, e.g., as a distributed computing system, to improve upon the likely availability of a single node. In such distributed computing systems, load balancing is often used to decide how to distribute the work amongst the member nodes of the distributed computing system.

Advancement in computer science has made adding or deleting nodes to or from a distributed computing system relatively simple and quick. Dynamically adding and removing nodes to a distributed computing system may have the benefit of quickly adjusting supply to demand. This in turn may lead to less waste due to overprovisioning and less failures due to insufficient capacity.

There are several load-balancing processes that may distribute work amongst a pool of member nodes. One example is a Round Robin process that assigns each member node in a pool of member nodes a substantially equal portion of work in a circular fashion.

Embodiments of the disclosure may be used in a wide variety of load-balancing distributed computing systems, such as those in which certain member nodes may retain or otherwise cache information obtained while servicing prior requests. In these and other distributed computing systems, it may be beneficial to employ a load-balancing process with low redistribution. One example of such a distributed computing system is a distributed computing system that serves Domain Name System (DNS) requests. With, for example, DNS, there may be a significant difference in the computing effort needed to respond to different queries, e.g., based on whether a request results in a cache miss or a cache hit as the servicing node attempts to look up a response for the query. For a cache hit, the response can simply be found in the servicing node's memory and returned to the requestor. For a cache miss, the servicing node may have to perform disk and/or network I/O, potentially sending multiple requests to other servers to find the correct response. These types of workloads may be better served by sending identical (or similar) queries to the same servicing node. In some embodiments, this is accomplished, during a baseline condition, by having a load balancer apply a modulus mathematical operator over some field included, or otherwise associated, with the request. However, problems may arise when member nodes are added to or deleted from the distributed computing system. Some embodiments, instead of using a typical modulus process, apply a low-redistribution load-balancing process that reduces this redistribution of work. and thus such a process may improve the performance of load balanced cloud style distributed computing systems where efficiencies are possible by sending the same or similar queries to the same member node.

As discussed above, some embodiments of the disclosure may be used for load-balancing in DNS servicing distributed computing systems, but various aspects of the disclosure may be employed in any suitable load-balancing context, particularly in any context in which low redistribution of would be beneficial. For example, besides DNS applications, embodiments of the disclosure may be used in other suitable applications, such as applications involving authentication (e.g., authenticated HTIP), so that redistribution that would require re-authentication may possibly be avoided. As another example, embodiments of the disclosure may be used for Network Address Translation devices that keep state. With regard to Network Address Translation devices that keep states, if network communication were to be redistributed, the state information for redistributed sessions would typically be lost and such sessions would have to be started over. However, some embodiments of the technology apply a low-redistribution load-balancing process to Network Address Translation devices that keep states in order to reduces the redistribution of network communications to these devices.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other embodiments, environment 100 can also include additional and/or different components. For example, in certain embodiments, the environment 100 can also include network storage devices, maintenance managers, and/or other suitable components (not shown).

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain embodiments, computing devices 110 can be organized into racks, action zones, groups, sets, or other suitable divisions. For example, in the illustrated embodiment, computing devices 110 are grouped into three host sets identified individually as first, second, and third host sets 112a-112c. In the illustrated embodiment, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communication between computing devices 110 and external network 140. In other embodiments, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services. For example, computing devices 110 can be configured to execute workloads and other processes, such as the workloads and other processes described herein.

In some embodiments, one of the network nodes 120 or one of the computing devices 110 may operate as a load-balancing computing device. The load-balancing computing device receives a load-balance request for a processing of a workload request associated with a workload, selects a member node of a distributed computing system to process the workload request, and assigns the processing of the workload request to the selected member node.

In some embodiments, one of more of the multiple hosts sets 112-112c functions as a distributed computing system in which each computing device operates as a member node of the distributed computing system.

In other embodiments, load-balancing is performed among network nodes, and one or more of the network nodes 120 is such a distributed computing system in which some of the network nodes 120 are member nodes of the distributed computing system. The network nodes 120 may be configured to execute workloads and other processes, such as the workloads and other processes described herein.

Illustrative Computing Device

Figure 2:
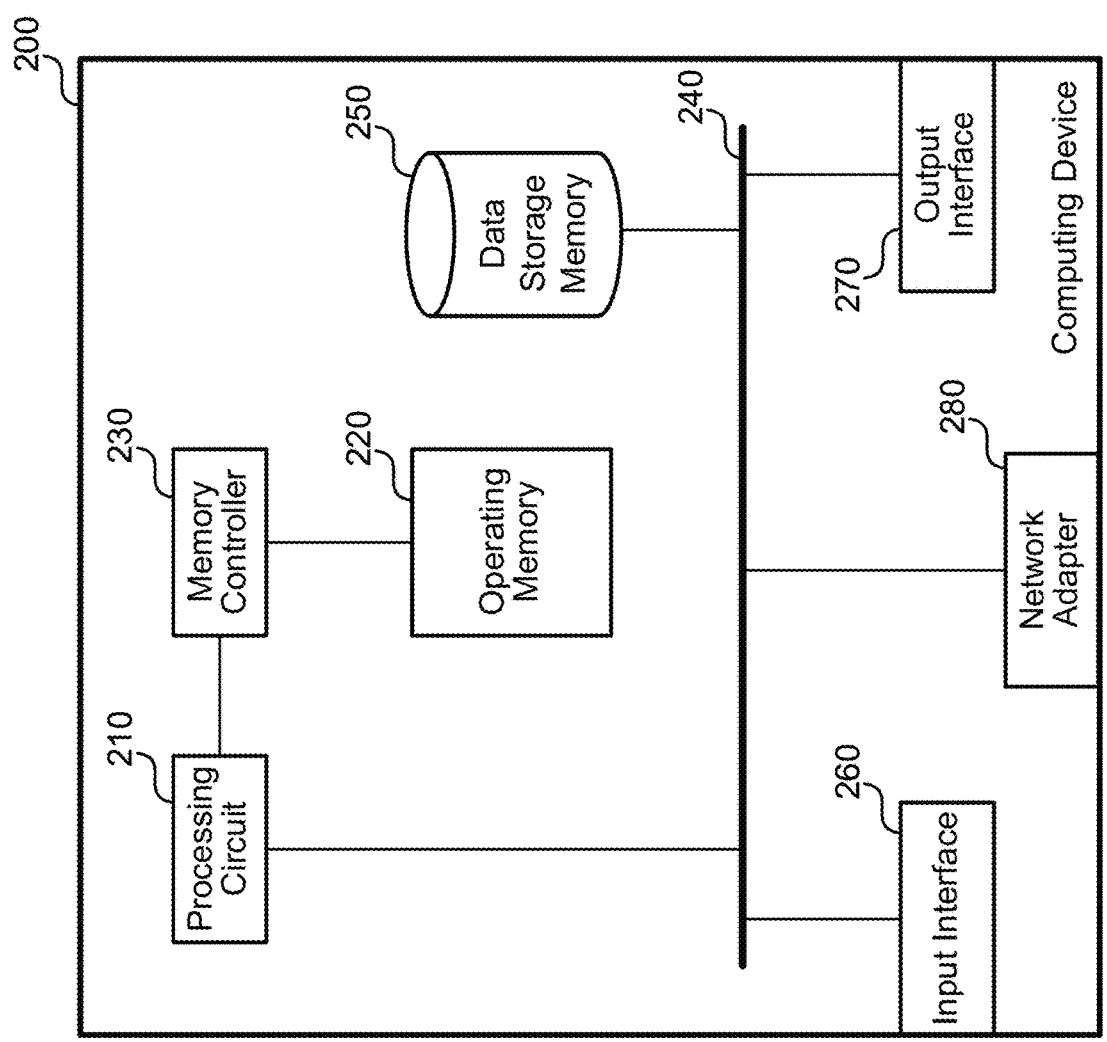
FIG. 2 is a block diagram illustrating one example embodiment of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an embodiment of computing device 110 or network node 120 of FIG. 1. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-sacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some embodiments of computing device 200 include at least one storage memory (e.g. data storage memory 250), at least one operating memory (e.g., operating memory 220) and at least one processor (e.g., processing unit 210) that are respectively adapted to store and execute processor-executable code that, in response to execution, enables computing device 200 to perform actions, such as, for example, the process illustrated in FIG. 3 and discussed below in conjunction with FIG. 3.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as computer-readable instructions stored in a computer-readable storage medium or be performed as a computer-implemented process. As an alternate example, these processes may be encoded as computer-executable instructions and transmitted via a communications medium.

Figure 3:
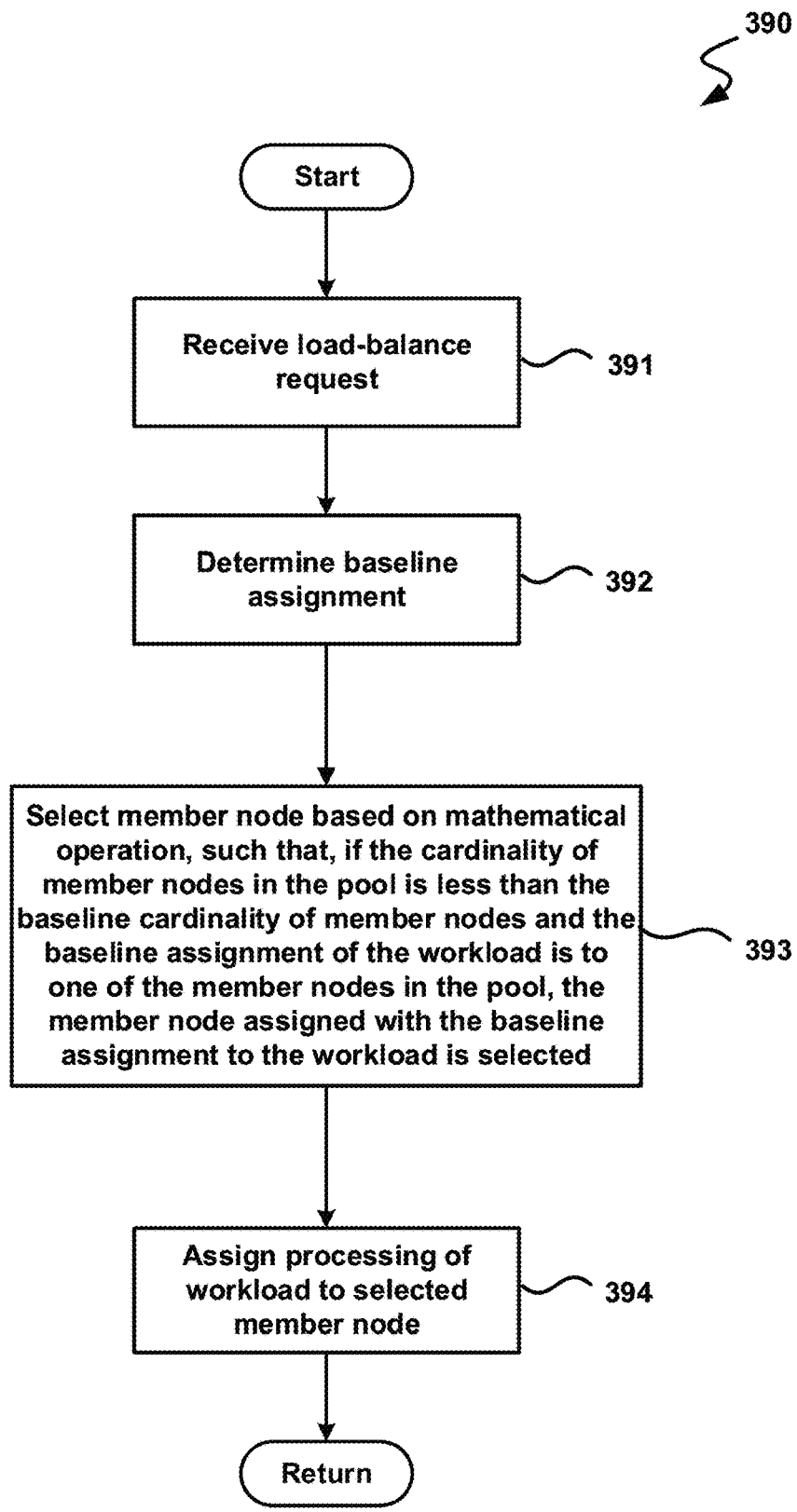
FIG. 3 is a logical flow diagram illustrating an embodiment of a process for load balancing.

FIG. 3 is a logical flow diagram illustrating process 390 for load balancing. After a start block, the process proceeds with block 391, where a load-balancing computing device (e.g., an embodiment of computing device 200 of FIG. 2) receives a load-balance request for a processing of a workload request associated with a workload. The process then proceeds to blocks 392-394, where the load-balancing computing device selects a member node of a distributed computing system to process the workload request, such that the member node is selected from amongst a pool of member nodes of the distributed computing system.

More specifically, the process first moves from block 391 to block 392. At block 392, a member node is determined for a baseline assignment for the workload using a baseline function such that the member node determined for the baseline assignment for the workload corresponds to the member node selected upon a cardinality of member nodes in the pool being equal to a baseline cardinality of member nodes. "Cardinality" refers to how many member nodes there are, that is, the quantity of member nodes. For example, if there are five member nodes in the member pool, the cardinality of member nodes in the pool is five.

The process then advances to block 393. At block 393, a member node is selected based on an outcome of a mathematical operation. The mathematical operation is performed on an identifier of the workload, the baseline cardinality of member nodes, and on the cardinality of member nodes in the pool. The mathematical operation is performed such that, if the cardinality of member nodes in the pool is less than the baseline cardinality of member nodes and the baseline assignment of the workload is to one of the member nodes in the pool, the member node assigned with the baseline assignment to the workload is selected. Also, the mathematical operation is based, at least in part, on the baseline assignment for the workload.

The process then proceeds to block 394, where the processing of the workload request is assigned to the selected member node. The processing then moves to a return block, where other processing is resumed.

In some embodiments, a load-balancing computing device includes a processor-readable storage medium, having stored thereon process-executable code for load balancing, that, in response to execution by at least one processor, enables actions, includes the actions of process 390 of FIG. 3.

Illustrative System

Figure 4:
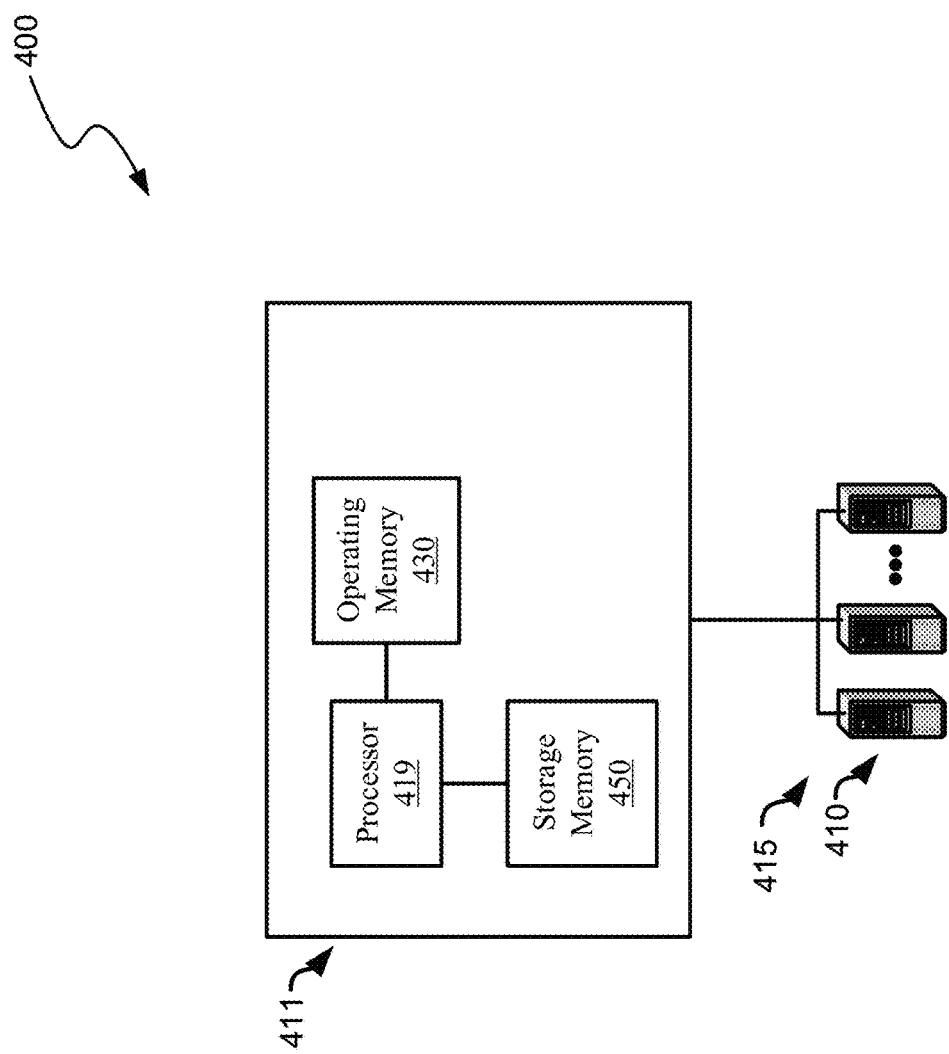
FIG. 4 is a block diagram illustrating an embodiment of a system for load balancing.

FIG. 4 is a block diagram illustrating an embodiment of a system (400) for load balancing. System 400 includes load-balancing computing device 411 and distributed computing system 415. Distributed computing system 415 includes multiple member nodes organized into a pool of member nodes 410. Computing device 411 includes operating memory 430, storage memory 450, and at least one processor 419.

Operating memory 430 is adapted to store run-time data for computing device 411. At least storage memory 450 and processor 419 are respectively adapted to store and execute processor-executable that, in response to execution, enable computing device 411 to perform actions, such as the actions of process 390 of FIG. 3 in one example. In some examples, computing device 411 receives a load-balance request and assigns the processing of the workload requested to the selected member node from amongst the pool of member nodes 410.

In some examples, pool of member nodes 410 includes member nodes from a distributed computing system joined together to reach a targeted level of availability. Load-balancing computing device 411 is arranged to provide a low-redistribution load-balancing technology to distribute the work amongst the nodes in the cluster (i.e., the member nodes in pool of member node 410). Nodes in the cluster (i.e., the member nodes in pool of member node 410) can be dynamically added and removed to adjust supply to demand.

Load-balancing computing device 411 is arranged to perform a low-redistribution load-balancing technology that reduces the redistribution of work amongst nodes in a cluster (e.g., member nodes in pool of member nodes 410) upon the cardinality of nodes changing (e.g., upon the quantity of member node in pool of member nodes 410 changing). Load-balancing computing device 411 may be used in suitable applications, such as in applications in which there are workloads for which it is beneficial to assign related, same, or similar workload requests to the same member node in a distributed computing system. The low-redistribution load-balancing technology reduces this redistribution of work so it is more likely that similar queries will be sent to the same member node. In some examples, load-balancing computing device 411 is an internal DNS server.

In some of these embodiments, the workload is a domain name service request. However, the disclosure is not so limited. For example, in addition to use in DNS applications, embodiments of the disclosure may be used in other suitable applications, such as applications involving authentication (e.g., authenticated HTTP, where the workload is an authenticated hypertext transfer protocol request), so that redistribution that would require re-authentication may be reduced. Embodiments of the disclosure may also be used for Network Address Translation devices, such as those discussed above. Further, the technology may also be employed in other applications, such as those for which the member nodes cache data, employ state information in processing requests, cache (and re-use for same arguments) the results of deterministic functions, or the like.

While some embodiments of load-balancing computing device 411 may implement the low-redistribution load-balancing technology in software, in other embodiments, the low-redistribution load-balancing technology is performed instead or additionally by firmware and/or hardware, such as a system-on-a-chip, application-specific integrated circuit, and/or other suitable hardware and/or firmware.

The cardinality of member nodes in pool of member nodes 410 may vary over time, based on, for example, the workload. For example, if the workload of individual member nodes in pool of member nodes 410 is too great, one or more member nodes may be added to pool of member nodes 410. Conversely, if the workload on individual member nodes in pool of member nodes 410 is too small, one or more member nodes may be removed from pool of member nodes.

The architecture shown in FIG. 4 shows an embodiment in which there is a separate load-balancing node in "front" of each of the member nodes. For instance, in some embodiments, the load-balancing node is a separate device from the member nodes of the distributed computing system, and the load-balancing computing device forwards the workload request to the selected member node after the workload is assigned to the selected member node. However, the disclosure is not so limited, and other embodiments may employ other architectures. For example, in some embodiments, each member node may itself perform load-balancing. For instance, in some embodiments, the request is sent to each member node, and each member node determines for itself whether it is to process that request. The member node that is to process the request determines that it is the member node that is to handle the request, and then proceeds to process the request. Each other member node determines that it is not the member node that is to process the request, and therefore drops/ignores the request responsive to the determination. In this example, each member node is itself a "load-balancing computing device."

Illustrative Function

One non-limiting embodiment of the low-redistribution load-balancing technology provided by way of example is a deterministic function that accepts 3 arguments as input and returns a positive integer representing a member node instance as output, where, in these examples, the three input arguments and return value are as follows.

Input Argument 1—a value representing the hash of the workload (e.g., a hash of the query). Any suitable hashing process can be used, such as MD4, MD5, SHA1 or size or ASCII codes of the workload. In some embodiments, Input Argument 1 is a hash of the fully-qualified domain name to be looked up. In other embodiments, Input Argument 1 is some other hash associated with the query and/or the workload or other identifier associated with the workload. In some embodiments, Input Argument 1 is a value associated with the user making the query, such as a cookie value or session identifier. In other embodiments, Input Argument 1 is some other suitable identifier that is based on a unique characteristic of the workload.

Input Argument 2—A value representing the baseline cardinality, i.e., the baseline of expected quantity of member nodes in the pool of member nodes. This value should be consistent across member nodes performing load balancing decisions, and should represent the expected cardinality of member nodes in the pool of member nodes. The low-redistribution load-balancing technology should work regardless of this value. However, in some embodiments with a recursive function, the further apart from this value the actual cardinality of current member nodes, the more iterations of the recursion function are performed.

Input Argument 3—A value representing the current cardinality of member nodes in the pool of member nodes. This value can either be self-learned or provided to the load-balancing computing device. Self-learning can be achieved by observing timeouts and other performance metrics and adjusting accordingly. For example, self-learning may determine that a member node is not responding, and may therefore determine that the non-responding member node has failed or been removed. Alternatively, the load-balancing computing device may have received an instruction indicating that the member node has been removed. Input Argument 3 should be fairly consistent across the fleet of nodes performing load balancing but does not necessarily have to be the same everywhere at any given time. This argument may be higher, lower, or the same as the baseline (Input Argument 2).

Return value—The return value represents the member node selected for the workload to be assigned. In some embodiments, including the specific embodiments discussed in this "Illustrative Process" section, the return values correspond to a numbering of each member node, where the numbering starts at 1, and does not exceed the current cardinality of member nodes (unless there are no member nodes, where zero is returned as an indication of error). In other embodiments, the numbering of the member nodes starts at 0, and does not exceed one less than the current cardinality of member nodes. In other embodiments, other suitable numbering schemes for the member nodes may be used. In embodiments where repeated invocations with a same particular value for Input Argument 1 (e.g., hash) are desired to be sent to a same member node, the return value may represent the member node selected by the low-redistribution load-balancing function.

Again, the specific arguments and manner of representing the return value discussed above are presented by way of example only, and the disclosure is by no means limited to this particular example.

Figure 5A:
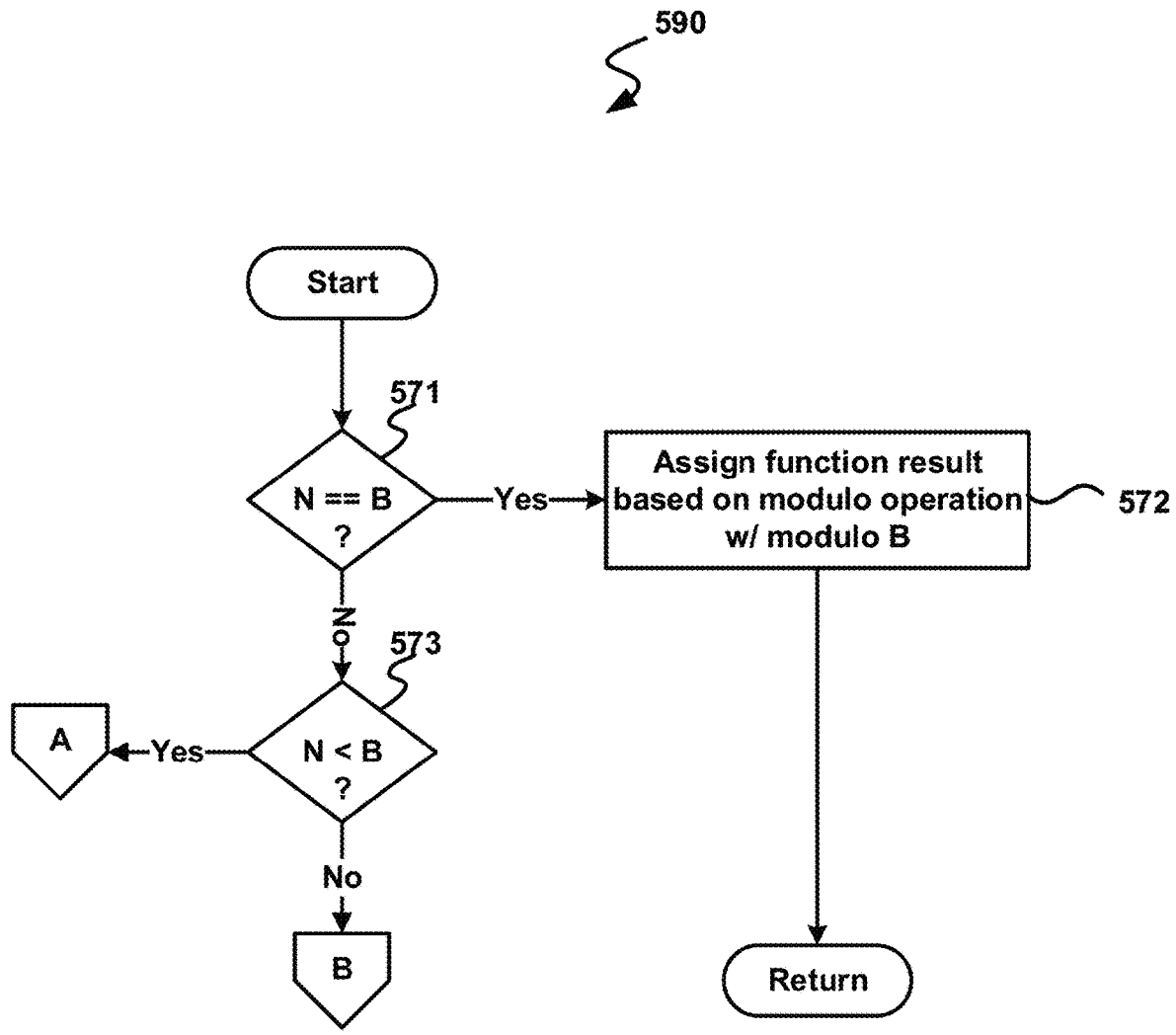
FIGS. 5A, 5B, and 5C are logical flow diagrams illustrating an embodiment of the process of FIG. 3.
Figure 5B:
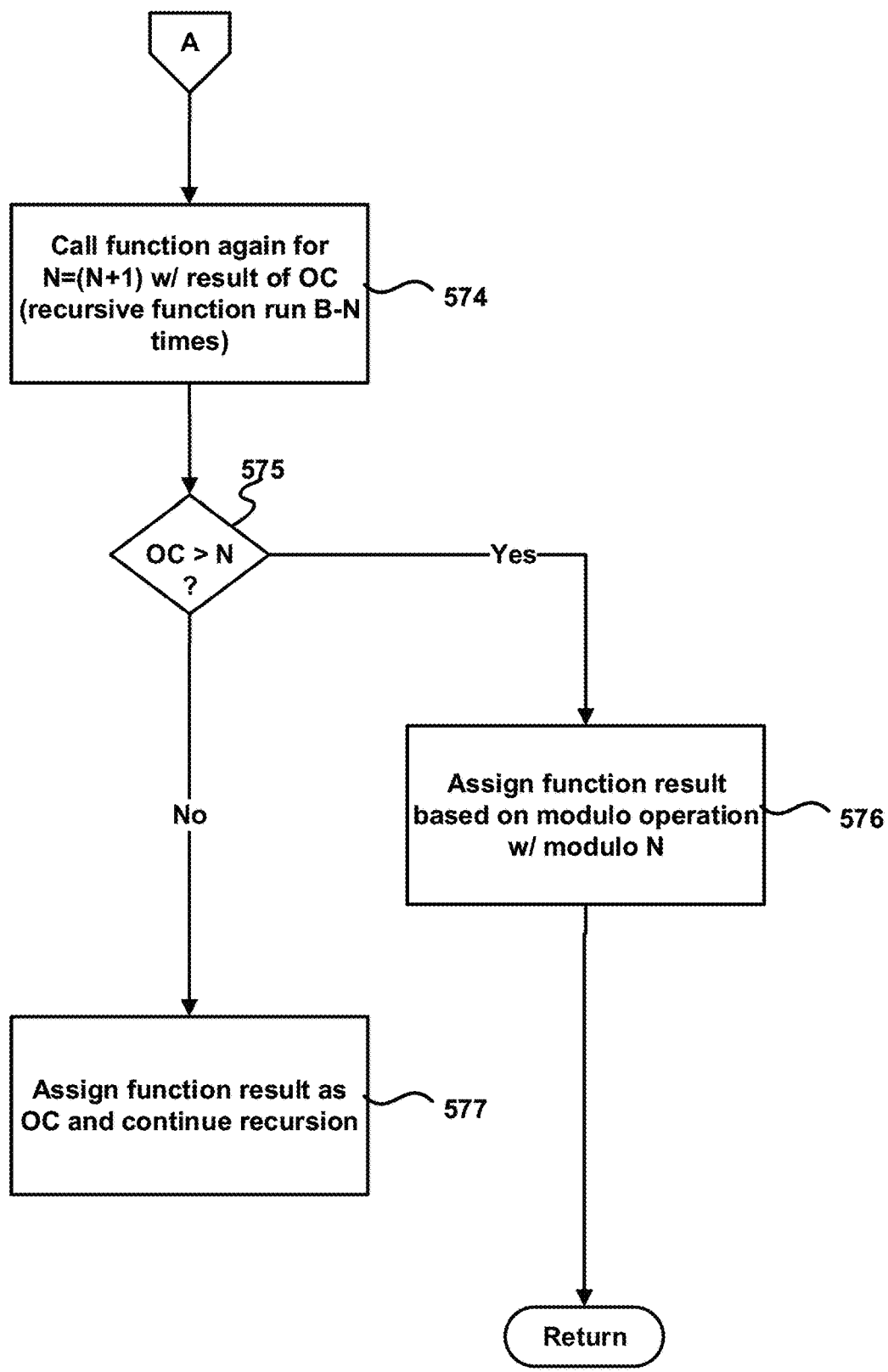
Figure 5C:
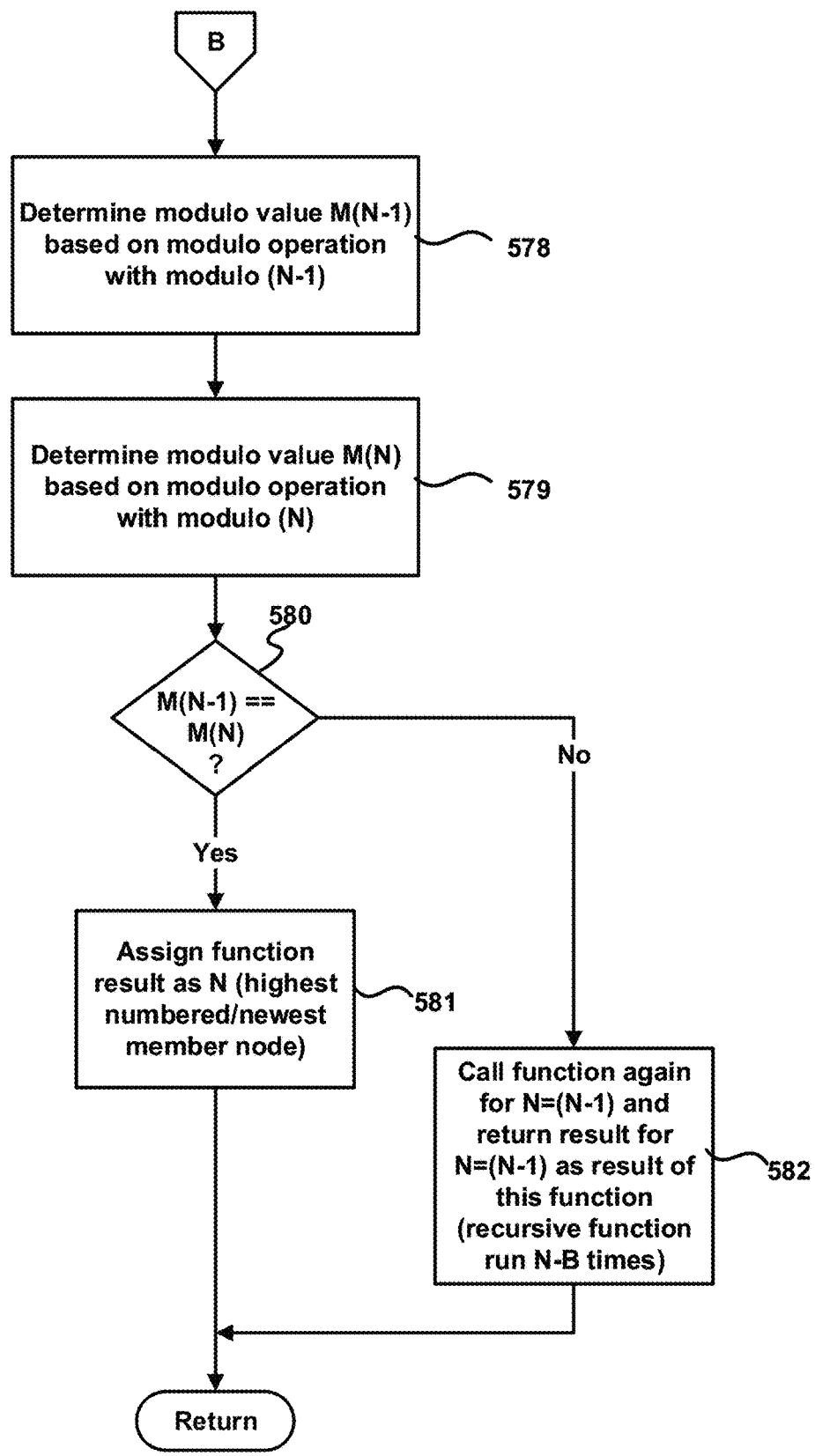

FIGS. 5A, 5B, and 5C are logical flow diagrams illustrating an embodiment of process 390 of FIG. 3. One embodiment of the process is a low-redistribution load-balancing process implemented in a function (590) with the three input arguments (Input Argument 1, Input Argument 2, and Input Argument 3) and result value as discussed above. In this example, H represents Input Argument 1, such that H is a value indicative of the workload (e.g., a hash value of a domain name); B represents Input Argument 2, such that B is a value indicative of the baseline cardinality of member nodes in the pool of member nodes; N represents Input Argument 3, such that N is the current cardinality of member nodes; and R represents the Result Value (e.g., a value representing the member node to which the workload request is to be assigned).

After a start block, the process proceeds to decision block 571, where a determination is made as to whether the current cardinality of member nodes N is equal to the baseline cardinality of member nodes B. If so, the process moves to block 572, where the result value R is assigned based on a modulo operation using modulo B, e.g., R=[(H mod B)+1]. The process then advances to a return block, where other processing is resumed.

If, however, the determination at block 571 is negative (i.e., N is not equal to B), the process instead proceeds to decision block 573, where a determination is made as to whether the current cardinality of member nodes N is less than the baseline cardinality of member nodes B. If so, in the proceeding steps, the member node assignments are distributed among a smaller set of member nodes.

If the determination at decision block 573 is positive, the process advances to block 574, where function 590 is called again using the value of N+1 for N, with the result of function 590 using the value of N+1 for N being assigned to old cell value OC. Accordingly, this is a recursive function that is run [(B−N)+1] times.

The process then moves to decision block 575, where a determination is made as to whether OC is greater than N. If so, the process advances to block 576, where the result value R is assigned based on a modulo operation using modulo N, e.g., R=[(H mod N)+1]. At block 576, because the old cell value would be assigned to a higher value than the current cardinality of member nodes for the function, instead the modulo is redone using modulo N. The process then advances to a return block, where other processing is resumed.

If instead the determination at decision block 575 is negative (i.e., OC is less than or equal to N), then the process instead advances to block 577, where the result value R is assigned based on a modulo operation using modulo OC, e.g., R=[(H mod OC)+1], and the recursion continues. At block 577, because the old cell value would be assigned to a value for one of the current member node, the result is assigned to the old cell value so as to minimize redistribution.

With regard to blocks 574-577, in essence, if the old cell value OC is less than N, the old cell value can continue to be used. For example, if the baseline is ten, then for each query for which the return value would be any value from 1-9, then the result that would be used with the baseline value of ten may still be used (block 577). Only if the value would have been ten does the result need to be redistributed. So if the value for the query would have been ten if the cardinality of member nodes was equal to the baseline value of ten, then the query needs to be redistributed based on modulo 9 rather than modulo ten (block 576). For all workloads having the result value is 1-9 for the baseline value, then the result is the same value that it would have been if there were ten member nodes, and for all workloads having a result value is ten for the baseline value, the workloads are redistributed in a round robin fashion over the remaining nine member nodes. In this way, the redistribution is reduced relative to conventional technology.

The function is called an additional time each further step the cardinality of member nodes is from the baseline. For example, if the baseline is ten, and there are only seven member nodes, the function proceeds as follows. First, a determination is made as to which member node the request would be assigned to if the cardinality of member nodes was equal to the baseline cardinality of ten. This is determined, for example, by a round robin distribution method, such as using modulo ten. Next, a determination is made as to which member node the request would be assigned to if the cardinality of member nodes was equal to nine. For example, if the request would have been sent to any of member nodes 1-9 in the case of ten member nodes, then the request will also be sent to the same member node as if the cardinality of member nodes were ten. If the request would have been sent to member node ten in the case of ten member nodes, the request is redistributed using a modulo nine calculation. Next, a determination is made as to which member node the request would be assigned to if the cardinality of member nodes was equal to eight. For example, if the request would have been sent to any of member nodes 1-8 in the case of nine member nodes, then the request will also be sent to the same member node as if the cardinality of member nodes were nine. If the request would have been sent to member node nine in the case of nine member nodes, the request is redistributed using a modulo eight calculation. Next, a determination is made as to which member node the request will be assigned to given that the cardinality of member nodes is equal to seven. This is determined as follows. If the request would have been sent to any of member nodes 1-7 in the case of eight member nodes, then the request will also be sent to the same member node as if the cardinality of member nodes were eight. If the request would have been sent to member node eight in the case of eight member nodes, the request is redistributed using a modulo seven calculation.

Accordingly, in some embodiments, at blocks 574-577, selecting a member node is based on an outcome of an iterative function performed on the identifier of the workload, the baseline cardinality of member nodes, and on the cardinality of the member nodes in the pool in response to the cardinality of member nodes in the pool being less than the baseline cardinality of member nodes, wherein the function is iterated a quantity of times given by the baseline cardinality of the member nodes minus the cardinality of the member nodes in the pool.

Further, in some embodiments, for the first iteration of the iterative function, the cardinality of member nodes being analyzed is one less than the baseline cardinality of member nodes. In some embodiments, for each iteration after the first iteration of the iterative function, the cardinality of member nodes being analyzed is one less than the cardinality of member nodes being analyzed for the previous iteration. In some embodiments, the iterative function includes, for each iteration of the iterative function: selecting the member node selected for one more member node than the cardinality of member nodes currently being analyzed in response to the member node selected for one more member node than the cardinality of member nodes currently being analyzed being one of the member nodes among the member nodes currently being analyzed; and selecting the member node based on a redistribution of the member node amongst the member nodes currently being analyzed in response to the member node selected for one more member node than the cardinality of member nodes currently being analyzed being outside of the member nodes currently being analyzed.

If the determination at decision block 573 is negative (i.e., N is greater than B), the process proceeds from decision block 573 to block 578. If so, in the proceeding steps, the member node assignments are distributed among a larger set of member nodes. At block 578, the modulation value M(N−1) is determined based on a modulo operation using modulo N−1, e.g., M(N−1)=[{H mod (N−1)}+1]. The process then moves to block 579, where the modulation value M(N) is determined based on a modulo operation using modulo N, e.g., M(N)=[(H mod N)+1]. The process then advances to decision block 580, where a determination is made as to whether M(N−1)=M(N). If so, the process proceeds to block 581, where the result value R is assigned a value of N (i.e., the highest numbered/newest member node). In this way, the correct small fraction is shed from each of the N−1 member nodes to the newest member node N. For example, if the quantity of member nodes increases by one from a baseline of four to a total of five, so that B is 4 and N is 5, and with four member nodes, each of the member nodes operated at 50%, then upon increasing the cardinality of member nodes from four to five, 10% of each member node is assigned to member node 5, so that now all five member nodes process 40%—or the purpose of the modulo operation performs is to be as close to those fractions as possible while being a relatively efficient computing operation.

If instead the determination at decision block 580 is negative, the process proceeds from decision block 580 to block 582, where function 590 is called again using the value of N−1 for N, with the result of function 590 using the value of N−1 for N being assigned to the result R of this function. Accordingly, this is a recursive function that is run [(N−B)+1] times. In this way, the old cell value is returned as the result.

With regard to blocks 578-582, in essence, if there is one more member node than the baseline cardinality of member nodes, then from each of the 1-B member nodes, (1/B+1) times the workload is redistributed to the B+1 member node, while keeping (B/B+1) times the workload with each of the 1-B member nodes, so that the redistribution is minimized—or the purpose of the modulo operation is to get as close to these fractions as possible with reasonable efficiency. If the cardinality of member nodes is greater than B+1, the process is simply repeated an additional time for each member node there is more than B+1 member nodes. For example, if the baseline cardinality of member nodes it ten, but there are twelve member nodes, then first, distribution for ten member nodes is determined (accordingly to a modulo ten operation, as previously discussed).

Next, distribution for eleven member nodes is determined as follows: relative the workloads assignments for ten member nodes, 1/11 of workload assignments for each member node 1-10, selected in a modulo eleven manner, are redistributed to member node eleven (leaving each of member nodes 1-10 with 10/11 of the workload requests relative to the case where there are ten member nodes)—or close to those fractions via the modulo eleven function. Next, distribution for the twelve member nodes is determined as follows: relative to the workloads assignments when there are eleven member nodes, 1/12 of workload assignments for each member node 1-11, selected in a modulo twelve manner, are redistributed to member node twelve (leaving each of member nodes 1-11 with 11/12 of the workload requests relative to the case where there are eleven member nodes)—or close to those fractions with the modulo twelve function.

Accordingly, in some embodiments, at blocks 578-582, for the first iteration of the iterative function, the cardinality of member nodes being analyzed is one greater than the baseline cardinality of member nodes. In some embodiments, for each iteration after the first iteration of the iterative function, the cardinality of member nodes being analyzed is one greater than the cardinality of member nodes being analyzed for the previous iteration. In some embodiments, the iterative function includes, for each iteration of the iterative function: determining the member node selected for one less member node than the cardinality of member nodes currently being analyzed; and redistributing the workload selections relative to one less member node than the cardinality of member nodes currently being analyzed such that about B/B+1 of the workload selections of each member node from the previous determination are retained relative to the selection of the previous determination and the remaining about 1/B+1 of workload selections from the previous determination are redistributed to the B+1 member node, wherein B represents the cardinality of member nodes from the previous determination.

In some embodiments of function 590, as discussed above, a modulo operation is used for distribution of workloads to a member node. However, in some embodiments, the modulo operation may be replaced by a different distribution operation, such as any suitable round robin distribution operation or other operation which distributes the workload relatively evenly among member nodes. The modulo operation is simply one example of an operation for distribution of the workloads to the member nodes, and the disclosure is not limited to this specific example.

Further, in some embodiments of function 590, as discussed above, Input Argument 1, H, is a hash value of the query. In other examples, some other numerical identifier associated with the workload may instead be used instead of using the hash value of the query.

In the embodiment of function 590 discussed above, function 590 is primarily contemplated for use in cases of planned removal and addition of member nodes due to the total workload, for which the highest numbered member node is removed upon a member node being removed, and for which, upon a member node being added, it is added with a number corresponding one greater than the highest numbered member node prior to the new member node being added. Function 590 may also be used in cases in which a member node is unexpectedly removed, where the member node removed is not necessarily the highest numbered member node, but in examples of these cases, external remapping of the member nodes, for example, by the caller of function 590 may improve the efficiency of function 590.

One example embodiment of function 590 in Perl code is given below. This embodiment is given way of example, and the scope of the disclosure is in no way limited to the embodiment shown. In this example, Input Argument 1 is $domain, Input Argument 2 is $baseline, Input Argument 3 is $current, and the Result Value is the result value returned by the subroutine GetNodeInstance.

```
#!/usr/bin/perl -w
sub GetNodeInstance {
    my ( $domain , $baseline , $current ) = @_;
    # +1 to mod to use 1-based indexing
    my $mod_current = ( $domain % $current ) + 1 ;
    my $inc =1; # member node increment/decrement amount, e.g., +1
    if ( $baseline == $current ) {
        return $mod_current;
    } else if ( $baseline > $current ) {
        # if fewer current member nodes, compress into a smaller set
        # determine prior hash (e.g., when current size was +1)
        $old_cell = GetNodeInstance($domain, $baseline,
        $current+$inc);
        if( $old_cell > $current ) {
            # Old cell cannot be used when member node
            # is no longer available, so use new hash value
            return $mod_current;
        } else {
```

```
            # Use the hash from prior (e.g., when size was +1)
            return $old_cell;
        }
    } else { # ( $baseline < $current )
        # Baseline is smaller than current number of member nodes
        # Calculate old modulo (e.g., when current size was -1)
        # and compare with current modulo.
        # this will shed just the right amount to new member nodes
        # +1 to mod to use 1-based indexing
        if ( ($domain % ($current-$inc)) + 1 == $mod_current ) {
            # shed this small fraction to the new member nodes
            return $current;
        } else {
            # return the old cell value
            return GetNodeInstance($domain, $baseline,
                $current-$inc);
        }
    }
}
```

As a further explanation of the example low-redistribution load-sharing algorithm given above, consider the following example domains and their corresponding hash values: [example.com, example.net, example.org] [100, 101, 219].

For a three-node pool of member nodes, with a baseline cardinality of three, those domains will initially be sent to member node [2,3,1] irrespectively of whether the low-redistribution load-balancing process or a standard modulus process with standard round-robin redistribution is used.

If member node 3 goes offline, then the standard modulus operation will redistribute traffic by using modulus 2 calculations over the set of member nodes. (The modulus operation are mod plus one, as previously discussed.) This will send traffic to [1,2,2]. The result is that all values are different from before, and thus the operation does not take advantage of the fact that member node 2 already very likely had example.com cached and member node 1 likely had example.org cached.

The result for the middle value (example.net) had to change as a result of member node three going offline, because member node three was no longer available. With the standard modulus operation, the first and last value also change. The low-redistribution load-balancing technology on the other hand would send the traffic to [2,2,1], so that only the middle value is changed, while the two other values stay the same. The low-redistribution load-balancing technology takes advantage of the fact that member node 2 likely had example.com and member node 1 likely had example.org already in their respective caches.

FIGS. 6A and 6B are two hash value/result tables illustrating example results for an example embodiment of the process of FIG. 5.

The two tables of FIGS. 6A and B show the return values from 10 random hash values (Column H). FIG. 6A shows the return values using the low-redistribution load-balancing technology discussed above, whereas FIG. 6B shows the return values using a standard modulus operation. Both start at 3 member nodes.

The low-redistribution load-balancing technology uses 3 as the baseline cardinality of member nodes, so that $baseline=3 in the example shown FIG. 6A. The H column to the left is each table is the hash value of the fully-qualified domain name, which is Input Argument 1 or $domain in the function. The top row above each table shows the actual cardinality of member nodes, which is Input Argument 3 or $current. Each table entry in the table of FIG. 6A shows the Result Value of returned by the function GetNodeInstance, wherein where Input Argument 2 or $baseline=3, $domain is the value at the left of the row of the table entry, and $current is the cardinality at the top of the column for the entry. So, for example, the top left entry of with $domain=7925 and $current=5 (and $baseline=3), the result of GetNodeInstance is 3, so that, with five member nodes, a query having a hash value of 7925 is assigned to member node 3. The table of FIG. 6B is the same, except that a standard modulus operation is used rather than a low-redistribution load-balancing technology.

To the right of each table is a column showing the quantity of changes in member node that occur in the assigned member node when starting with five member nodes, and dropping one member node at a time until there is but one member node, for each hash value. So that, for the table of FIG. 6A, it can be seen that, for a query hash value of 7925, when starting with five member nodes, and dropping one member node at a time until there is but one member node, there are two changes to the assigned member node when using the low-redistribution load-balancing technology. Further, for a query hash value of 6472, when starting with five member nodes, and dropping one member node at a time until there is but one member node, there are two changes to the assigned member node when using the low-redistribution load-balancing technology.

FIG. 6B is the same, but for the standard modulus function. The total quantity of changes for all hash values shown in the table in shown in each of FIGS. 6A and 6B, beneath the column of values to the right of the column, and the total is in bold. There are 10 total changes for FIG. 6A, and 28 total changes for FIG. 6B.

FIGS. 6A and 6B each also have three rows below the top, one for "# of top," another for "Ideal," and another for "Diff." This is done for each column of each table except for the last column of each table, because for the last column of each table, there is only one member node, and therefore all queries must be assigned to that member node. The row for "# of top" shows the quantity of queries for the cardinality of member nodes of that column for which the highest numbered member node is selected. The row for "Ideal" shows the ideal quantity for "# of top" with exactly equal distribution-because there are ten hash values, there would ideally be [10/$current] for each column. The row for "Diff" shows the absolute difference between "# of top" and "Ideal" for each column. For each table, all of the Diff results are added together to give a result in bold at the end of the "Diff" row, which is 2.83 for each table of FIGS. 6A and 6B.

Both may have the equal effectiveness in terms of how even the load is distributed. In this example illustrated in FIGS. 6A and 6B both have an effectiveness score of 2.83 derived from the absolute delta between the ideal distribution and the actual distribution. However, as the member node count changes in the range 1-5, it can be seen that the low-redistribution load-balancing technology is only redistributing 10 workloads to new member nodes. This is far less of redistribution than the 28 that the standard modulus operation redistributes.

CONCLUSION

While the above Detailed Description describes certain embodiments of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific embodiments disclosed herein, unless the Detailed Description explicitly defines such terms. Accordingly, the actual scope of the technology encompasses not only the disclosed embodiments, but also all equivalent ways of practicing or implementing the technology.

I claim:

1. A method for load balancing, comprising:
   receiving, by a load-balancing computing device, a load-balance request for a processing of a workload request associated with a workload;
   selecting, by the load-balancing computing device, a member node of a distributed computing system for processing the workload request, such that the member node is selected from amongst a pool of member nodes of the distributed computing system, and such that the selecting includes:
      determining a member node for a baseline assignment for the workload using a baseline function such that the member node determined for the baseline assignment for the workload corresponds to the member node selected if a cardinality of member nodes in the pool is equal to a baseline cardinality of member nodes; and
      selecting a member node based on the baseline cardinality of member nodes and on the cardinality of member nodes in the pool, such that, if the cardinality of member nodes in the pool is less than the baseline cardinality of member nodes and the baseline assignment of the workload is to one of the member nodes in the pool, the member node assigned with the baseline assignment to the workload is selected; and
   assigning the processing of the workload request to the selected member node.

2. The method of claim 1, wherein the workload is a domain name service request.

3. The method of claim 1, wherein the workload is an authenticated hypertext transfer protocol request.

4. The method of claim 1, wherein the identifier of the workload is a hash of a domain name associated with the workload.

5. The method of claim 1, wherein the load-balancing device is a member node of the pool of member nodes.

6. The method of claim 1, wherein selecting a member node is based on an outcome of an iterative function performed on the identifier of the workload, the baseline cardinality of member nodes, and on the cardinality of the member nodes in the pool in response to the cardinality of member nodes in the pool being less than the baseline cardinality of member nodes, wherein the function is iterated a quantity of times equal to the baseline cardinality of the member nodes minus the cardinality of the member nodes in the pool.

7. The method of claim 6, wherein
   for the first iteration of the iterative function, the cardinality of member nodes being analyzed is one less than the baseline cardinality of member nodes;
   for each iteration after the first iteration of the iterative function, the cardinality of member nodes being analyzed is one less than the cardinality of member nodes being analyzed for the previous iteration; and
   wherein the iterative function includes, for each iteration of the iterative function:
      selecting the member node selected for one more member node than the cardinality of member nodes currently being analyzed in response to the member node selected for one more member node than the cardinality of member nodes currently being analyzed being one of the member nodes among the member nodes currently being analyzed; and
      selecting the member node based on a redistribution of the workload selections amongst the member nodes currently being analyzed in response to the member node selected for one more member node than the cardinality of member nodes currently being analyzed being outside of the member nodes currently being analyzed.

8. The method of claim 1, wherein:
   selecting a member node is based on an outcome of an iterative function performed on the identifier of the workload, the baseline cardinality of member nodes, and on the cardinality of the member nodes in the pool in response to the cardinality of member nodes in the pool being greater than the baseline cardinality of member nodes; and
   wherein the function is iterated a quantity of times defined by the cardinality of member nodes in the member pool minus the baseline cardinality of member nodes.

9. The method of claim 8, wherein
   for the first iteration of the iterative function, the cardinality of member nodes being analyzed is one greater than the baseline cardinality of member nodes;
   for each iteration after the first iteration of the iterative function, the cardinality of member nodes being analyzed is one greater than the cardinality of member nodes being analyzed for the previous iteration; and
   wherein the iterative function includes, for each iteration of the iterative function:
      determining the member node selected for one less member node than the cardinality of member nodes currently being analyzed; and
      redistributing the workload selections relative to one less member node than the cardinality of member nodes currently being analyzed such that B/B+1 of the workload selections of each member node from the previous determination are retained relative to the selection of the previous determination and the remaining 1/B+1 of workload selections from the previous determination are redistributed to the B+1 member node, wherein B represents the cardinality of member nodes from the previous determination.

10. The method of claim 1, wherein the load-balancing device is a separate device from the member nodes of the distributed computing system.

11. The method of claim 10, further comprising:
    forwarding the workload request to the selected member node.

12. A method for load balancing, comprising:
    receiving, by a load-balancing computing device, a load-balance request for a processing of a workload request associated with a workload;
    selecting, by the load-balancing computing device, a member node of a distributed computing system to process the workload request, such that the member node is selected from amongst a pool of member nodes of the distributed computing system, and such that the selecting includes:

determining a member node for a baseline assignment for the workload using a baseline function such that the member node determined for the baseline assignment for the workload corresponds to the member node selected upon a cardinality of member nodes in the pool being equal to a baseline cardinality of member nodes; and selecting a member node based on an outcome of an iterative function performed on an identifier of the workload, on the baseline cardinality of member nodes, and on the cardinality of member nodes in the pool greater than the baseline cardinality of member nodes in response to the cardinality of member nodes in the pool being greater than the baseline cardinality of member nodes, wherein the function is iterated a quantity of times defined by the cardinality of member nodes in the member pool minus the baseline cardinality of member nodes; and assigning the processing of the workload request to the selected member node.

13. The method of claim 12, wherein for the first iteration of the iterative function, the cardinality of member nodes being analyzed is one greater than the baseline cardinality of member nodes;

for each iteration after the first iteration of the iterative function, the cardinality of member nodes being analyzed is one greater than the cardinality of member nodes being analyzed for the previous iteration; and wherein the iterative function includes, for each iteration of the iterative function:

determining the member node selected for one less member node than the cardinality of member nodes currently being analyzed; and redistributing the workload selections relative to one less member node than the cardinality of member nodes currently being analyzed such that B/B+1 of the workload selections of each member node from the previous determination are retained relative to the selection of the previous determination and the remaining 1/B+1 of workload selections from the previous determination are redistributed to the B+1 member node, wherein B represents the cardinality of member nodes from the previous determination.

14. The method of claim 12, wherein the workload is a domain name service request.

15. A computing device, comprising:

an operating memory adapted to store run-time data for the computing device; and at least one storage memory and at least one processor that are respectively adapted to store and execute processor-executable code that, in response to execution, enables the computing device to perform actions, including:

receiving a load-balance request for a processing of a workload request associated with a workload;

selecting a member node of a distributed computing system to process the workload request, such that the member node is selected from amongst a pool of member nodes of the distributed computing system, and such that the selecting includes:

determining a member node for a baseline assignment for the workload using a baseline function such that the member node determined for the baseline assignment for the workload corresponds to the member node selected upon a cardinality of member nodes in the pool being equal to a baseline cardinality of member nodes; and selecting a member node based on the baseline cardinality of member nodes, and on the cardinality of member nodes in the pool, such that, if the cardinality of member nodes in the pool is less than the baseline cardinality of member nodes and the baseline assignment of the workload is to one of the member nodes in the pool, the member node assigned with the baseline assignment to the workload is selected; and assigning the processing of the workload request to the selected member node.

16. The computing device of claim 15, wherein the workload is a domain name service request.

17. The computing device of claim 15, wherein the identifier of the workload is a hash of a domain name associated with the workload.

18. The computing device of claim 15, wherein the computing device is a member node of the pool of member nodes.

19. The computing device of claim 15, wherein the computing device is a separate device from the member nodes of the pool of member nodes.

20. The computing device of claim 19, the actions further including forwarding the workload request to the selected member node.

* * * * *